United States Patent [19]

Andrew de Leon et al.

[11] Patent Number: 5,506,565
[45] Date of Patent: Apr. 9, 1996

[54] DEVICE FOR SIGNALING THE FELLING OF A TREE AND A SYSTEM FOR FOREST CONSERVATION

[76] Inventors: Joseph Andrew de Leon, 1121 N. Milwaukee St., Milwaukee, Wis. 53202; Brian W. Petersen, 2028 N. Martin Luther King Dr., Milwaukee, Wis. 53212

[21] Appl. No.: 83,726

[22] Filed: Jun. 25, 1993

[51] Int. Cl.⁶ .................................................. G08B 19/00
[52] U.S. Cl. ...................... 340/522; 340/539; 340/584; 340/689
[58] Field of Search ........................... 340/521, 522, 340/539, 589, 588, 584, 429, 689; 200/52 A, 61.52, 61.45 R

[56] References Cited

U.S. PATENT DOCUMENTS

| | | | |
|---|---|---|---|
| 4,521,120 | 6/1985 | Blank et al. | 340/577 X |
| 4,958,145 | 9/1990 | Morris | 340/689 |
| 5,045,839 | 9/1991 | Ellis et al. | 340/689 X |
| 5,089,808 | 2/1992 | Amirdash | 340/689 X |
| 5,168,264 | 12/1992 | Agustin | 340/689 X |

*Primary Examiner*—James J. Groody
*Assistant Examiner*—John W. Miller
*Attorney, Agent, or Firm*—Godfrey & Kahn

[57] ABSTRACT

A device (10) for signaling the felling of a tree (50) includes a transmitter, an inclination switch (14) which is positioned or mounted within the trunk (52) of the tree (50), the inclination switch (14) being responsive to detect inclination such that the inclination switch (14) is off when the trunk (52) is in an upright position and the switch (14) is on when the trunk (52) has been felled and a fire alarm switch (15) which is responsive to detect a threshold temperature such that the fire alarm switch (15) is off when the environment's temperature is lower than the threshold and the fire alarm switch (15) is on when the threshold temperature is exceeded. The transmitter is connected to the inclination switch (14) and the fire alarm switch (15) and is energized to transmit a signal to a remote location when either or both of the switches is on. The device (10) may be part of a system which includes a plurality of like devices (10) each of which are installed into different trees (50). The trees (50) into which the devices (10) are to be installed may be strategically selected in a pattern among trees to protect the entire forest. In order to determine which device (10) is transmitting a signal, two receivers (60, 62) and triangulation techniques are employed.

15 Claims, 9 Drawing Sheets

DEVICE FOR SIGNALING THE FELLING OF A TREE AND A SYSTEM FOR FOREST CONSERVATION

FIELD OF THE INVENTION

This invention relates generally to a device for signaling the felling of a given tree, and to a system for forest conservation by strategic locating of such devices.

BACKGROUND OF THE INVENTION

The economic value of trees has long been recognized by society. In countries such as Brazil, Madagascar, and Malaysia, forest resources constitute a significant part of their economy. Unfortunately, the wholesale cutting of trees and resultant deforestation have been linked to environmental problems.

Trees have ecological value as well. Deforestation on a local level results in flooding and erosion. The absence of trees to absorb flood waters in the Philippines, for example, has been blamed for millions of dollars worth of property damage and hundreds of lives. On a more global level, problems such as global warming and the greenhouse effect may potentially result from deforestation around the world.

In response to the aforementioned problems, governments around the world are now enacting policies to conserve forests. Unfortunately, policies to conserve forests are expensive and difficult to implement. Programs such as reserve area tree protection and logging bans have proven to be unsuccessful at halting tree cutting. Countries such as Brazil are expected to spend millions of dollars to launch remote sensing satellites to monitor their rain forests. Other present methods of implementing forest conservation policies tend to demand a large amount of manpower and are expensive.

Accordingly, a need has developed for a device for signaling the felling of a tree and a system for forest conservation which are inexpensive, require minimum manpower, and which are effective in accomplishing their purpose.

SUMMARY OF THE INVENTION

In accordance with the present invention, the device for signaling the felling of a tree comprises a housing and an electronic circuit which fits within such housing. The device is ordinarily positioned or mounted within the trunk of the tree and the electronic circuit of the device include an inclination switch which is responsive to detect inclination of the tree trunk and a fire alarm switch which is responsive to a threshold temperature. The inclination switch is "off" when the tree trunk is upright and is substantially vertical and "on" when the tree trunk has been felled and is substantially horizontal. The fire alarm switch is "off" when the external temperature is lower than the threshold temperature (temperature of a forest fire) and "on" when the external temperature exceeds the threshold temperature.

The electronic circuit also includes a transmitter which comprises a duty cycle oscillator, a radio frequency oscillator, a logic identifying circuit, an oscillator frequency beater, an RF power amplifier, an impedance matching circuit, and an antenna. The transmitter is connected to the switches and is energized to transmit a signal to a remote location when either of the switches is on.

The aforedescribed device may be a part of the system for forest conservation when the device is one of a plurality of such devices, each of which are installed into different trees. The trees into which the devices are to be installed may be strategically selected in a pattern among trees to protect the entire forest. In order to determine which device is transmitting a signal, two receivers and triangulation techniques are employed.

Further objects, features, and advantages of the invention will be apparent from the following detailed description taken in conjunction with the accompanying drawings.

DETAILED DESCRIPTION OF THE PREFERRED EMBODIMENT

With reference to the drawings, a device for signaling the felling of a tree of the present invention is generally indicated at 10 in FIGS. 1, 2, 3 and 4. The device 10 comprises an electronic circuit including various electronic or circuit components which are mounted on or connected with a circuit board 11, and a housing 13. The device 10 transmits a traceable radio frequency beacon signal to indicate the felling of a tree.

The electronic circuit includes a battery 12, an inclination switch 14, a fire alarm switch 15, a trigger 16, a duty cycle oscillator 18, a radio frequency (RF) oscillator 20, a logic identifying circuit 22, oscillator frequency beater 23, an RF power amplifier 24, an impedance matching circuit 26, and an antenna 28 which collectively form an electronic, radio-frequency transmitter. These electronic and circuit components are represented by block diagrams and are interconnected by wiring which is generally indicated by the lines shown in FIG. 1 between the battery 12, the inclination switch 14, the fire alarm switch 15, the trigger 16, the duty cycle oscillator 18, the RF oscillator 20, the logic identifying circuit 22, the oscillator frequency beater 23, the RF power amplifier 24, the impedance matching circuit 26, and the antenna 28.

Figure 1:
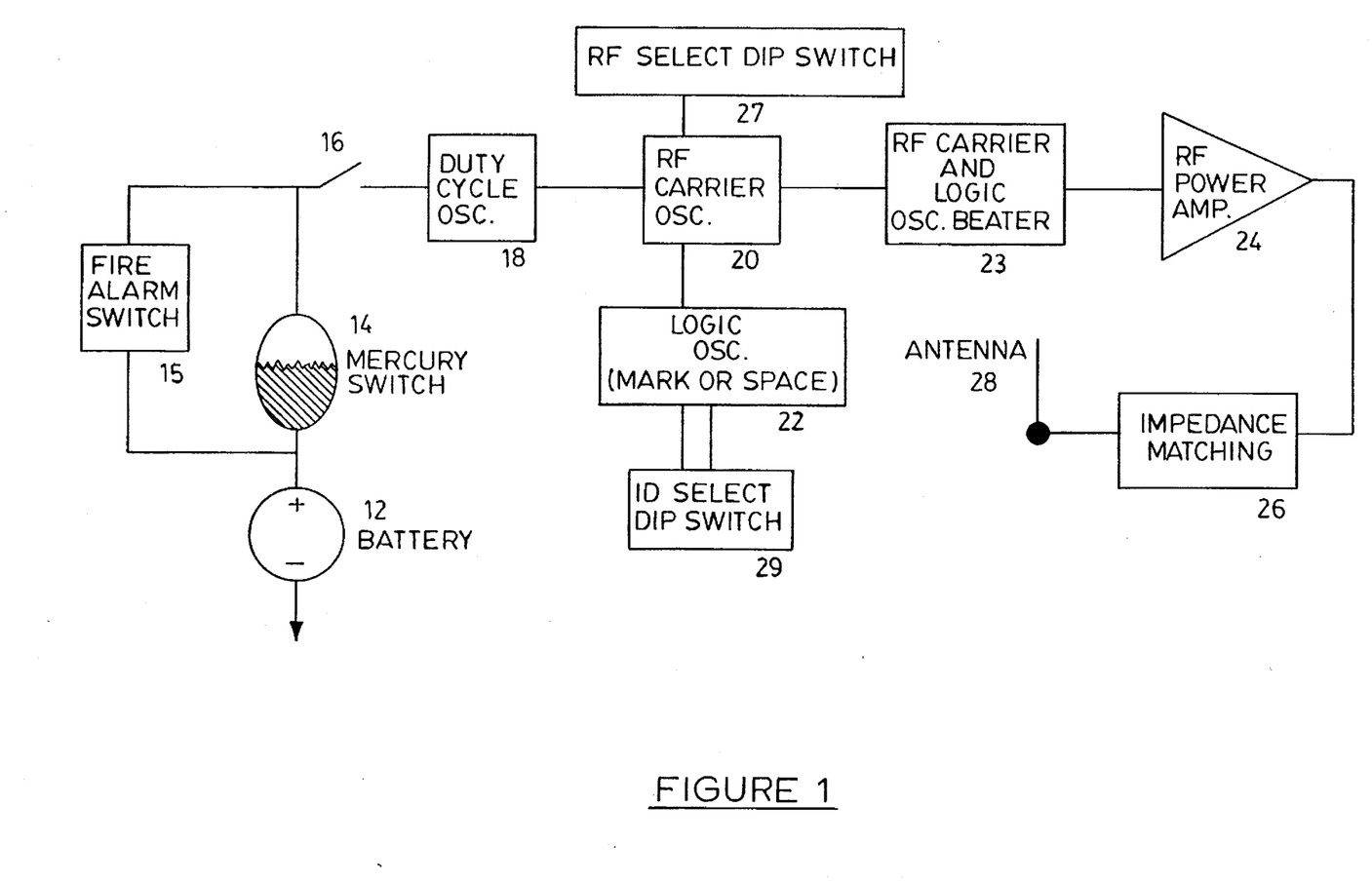
FIG. 1 is a schematic representation of the transmitter which forms a part of the device for signaling the felling of a tree and the system for forest conservation.

The battery 12 is selected to deliver approximately three watts of powers to the antenna 28 during the "on" time of the transmit duty cycle of the duty cycle oscillator 18, described below. The battery 12 preferably has excellent energy storage characteristics and a medium shelf life of ten (10) years. Commercially available batteries employing lithium have approximately 10 to 20 years shelf life and meet the above-described criteria for the battery 12.

The inclination switch 14 is responsive to detect inclination of the tree trunk such that the inclination switch 14 is "off" when physically oriented in one direction and "on" when repositioned into another orientation. Examples of switches responsive to detect inclination include mercury switches, and mass/hammer switches. Mass/hammer switches make electrical contact when the direction of gravitational force changes and causes a mass to move and form a bridge creating electrical contact. It is noted that there are numerous other examples of switches responsive to inclination which are suitable for the purposes described herein and well-known in the art, and are not specifically discussed here.

The fire alarm switch 15 is responsive to detect a threshold external temperature such that the fire alarm switch is "off" when the external temperature is less than a threshold temperature and when the external temperature exceeds the threshold temperature the fire alarm switches "on". The threshold temperature will be the temperature at which a forest fire starts for a certain geographic location. Examples of electronic switches responsive detect temperature include thermistors and thermocouples. Non-electrical devices may also be used to detect threshold temperatures. Martensitic metals or alloys have a specific shape at a specific temperature. This shape will change at a specific threshold temperature. Thus, the metal or alloy may be chosen that it turns the device "on" by changing its shape at a specific threshold temperature and "off" at temperatures lower than the threshold. It is also noted that there are numerous other examples of switches to detect a threshold temperature which are suitable for the purpose described herein and well-known in the art, and are not specifically discussed herein.

The trigger 16 is an electrical switch which controls power to the electronic circuit, the purpose of which is to prevent the transmission of false alarms by the device 10 during shipment. The trigger 16 is necessary because these devices may encounter various attitudes of inclination during shipment. The trigger 16 will be of a one-time "on" type. The trigger 16 will make contact and provide electrical continuity between the switch 14 and the entire circuit. It is intended that the electrical continuity between the switch 14 and the transmitter circuit be very difficult to break without physically destroying the device 10.

The function of the duty cycle oscillator 18 is to control the length of the radio frequency transmission by controlling the "on" time of the RF oscillator 20, and has an "on" time of approximately ten percent (10%). The frequency of the oscillation is high enough and power of the transmitter strong enough for a radio frequency receiver to monitor the signal and detect the direction from which the radio frequency transmissions are originating. The reduced duty cycle is meant to conserve the energy of the battery 12. The functions of the duty cycle oscillator 18 may be achieved by a general purpose timer/oscillator. An example of a commercially available timer/oscillator is the National Semiconductor LM555 integrated circuit chip and other general purpose oscillator chips. The "on" time duty cycle, signal frequency and power is subject to any FCC regulations or any other communication restrictions in other countries.

The RF oscillator 20 establishes the carrier frequency of operation and produces a relatively small-powered signal consisting of a pure sine wave. An amplified version of this signal will be used for transmission, thus a pure signal of only the first harmonic (fundamental frequency) is optimal. The frequency of this signal is subject to FCC regulations and communication restrictions in other countries. Because the allowable frequency may vary from country to country, the fundamental carrier frequency can be varied by designing different components into the circuit, for example, an RF select DIP switch 27. Examples of oscillator circuits which can be used include the Hartley or Wien Bridge oscillators.

Figure 5A:
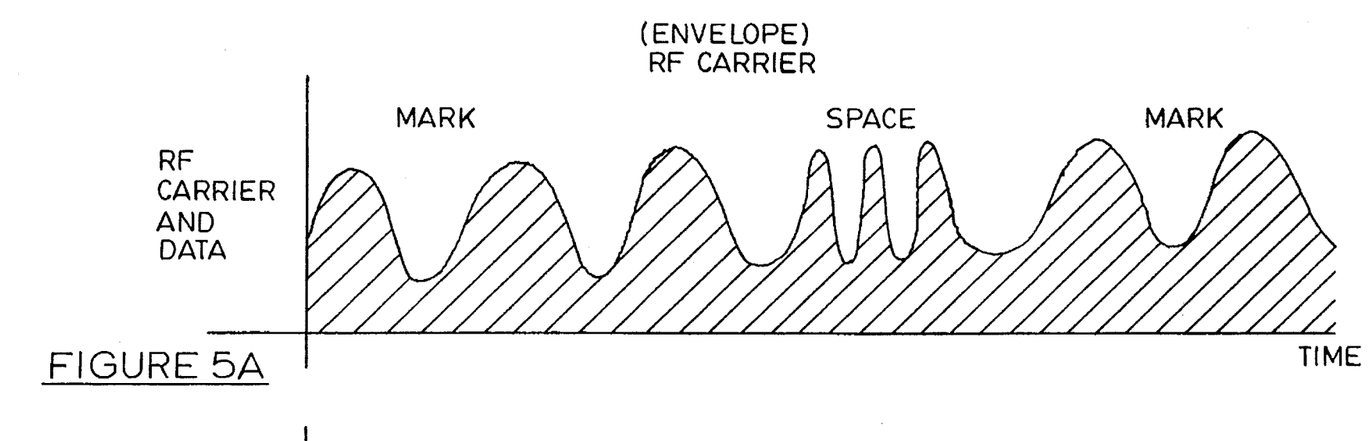
FIG. 5 illustrates Frequency Shift Keying, showing RF Carrier and Data, and Duty Cycle Oscillations respectively, versus time, and further showing "mark" and "space" conditions.
Figure 5B:
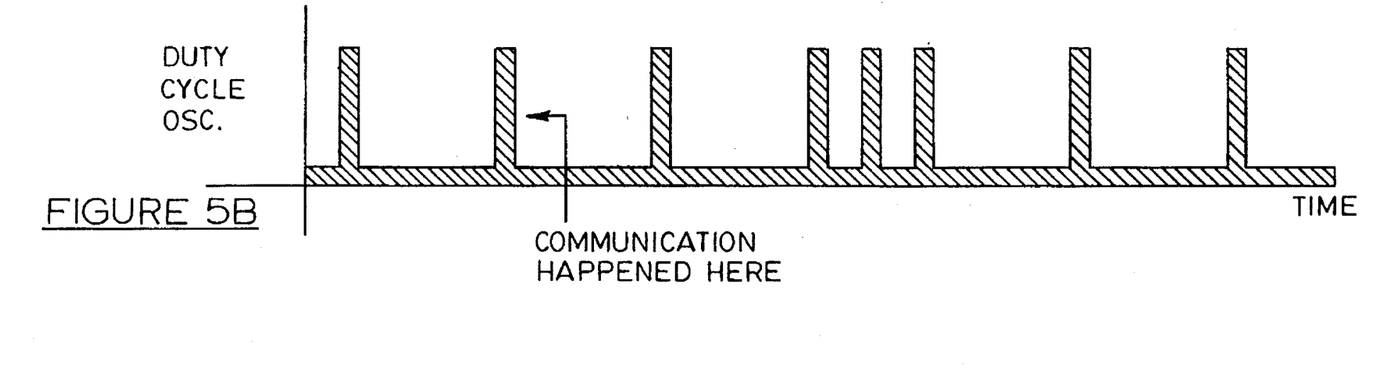

The logic oscillator 22 generates two frequencies, one representing a mark (logic 1) or space (logic 0) conditions. A series of mark and/or space oscillations are sent out to the oscillator beating circuit. The series of frequencies representing mark and/or space conditions is programmed by an ID select DIP switch 29. The above described marks and spaces create the basis to perform frequency shift keying (FSK) transmissions. FIG. 5 illustrates frequency shift keying. The oscillator frequency beater 23 modulates the RF oscillator signal at the frequency of the logic ID oscillator 22. This is known as "beating" two oscillations signals together.

The RF power amplifier 24 boosts the power strength of the small signal. This small signal is composed of the fundamental carrier frequency generated by the RF oscillator and the logic ID frequency generated by the logic oscillator 22. The two signals are beaten together. The power boost is made to be sufficient to transmit approximately three watts of power from the antenna 28. A common emitter-type amplifier circuit is suitable to amplify the signal in this manner. The amount of power gain is again subject to FCC regulations or communications restrictions in other countries.

In accordance with the Maximum Power Transfer Theorem, the impedance matching circuit 26 matches the output impedance of the RF power amplifier 24 to the input of the antenna 28 in order to maximize the amount of radio frequency energy generated by the RF power amplifier 24 to be transferred to the antenna 28. The impedance matching circuit 26 may consist of any combination of resistive, capacitive, inductive, and semiconductor components which will allow the most energy to be transmitted. The impedance matching circuit 26 maximizes radio frequency energy distribution with minimal power drain on the battery 12.

The antenna 28 transmits the radio frequency energy for detection by a remote receiver, explained below. The antenna 28 may be integral to the circuit board 11 which holds the abovementioned electrical components, or the antenna may be a component in itself, electrically connected to the printed circuit board 11. The specific type of antenna 28 employed will be related to the frequency of transmission, directionality of power distribution, and intended transmission environments, among other things.

Figure 2:
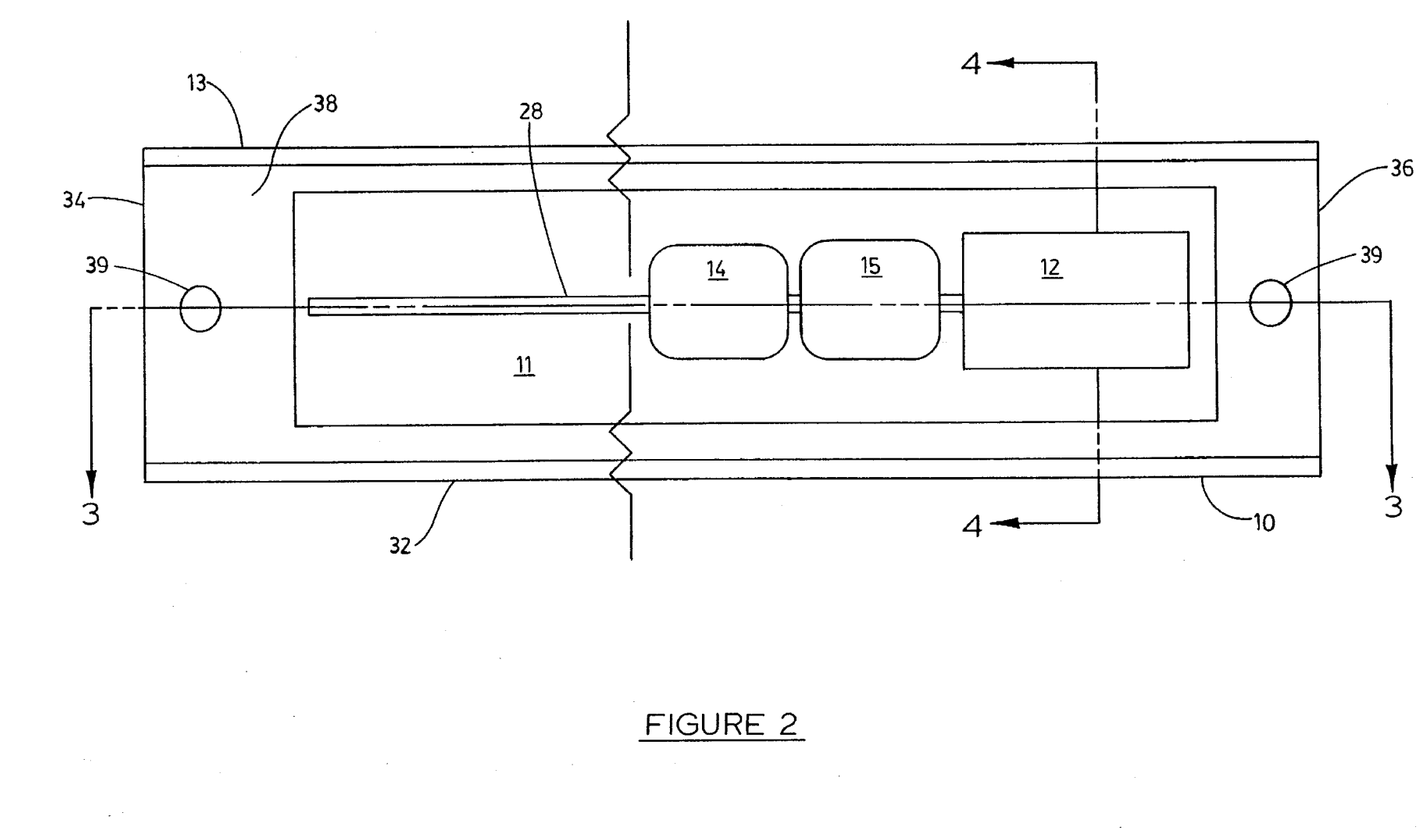
FIG. 2 is a plan view of the device for signaling the felling of a tree of the present invention, with portions of the housing being broken away for purposes of illustration.
Figure 3:
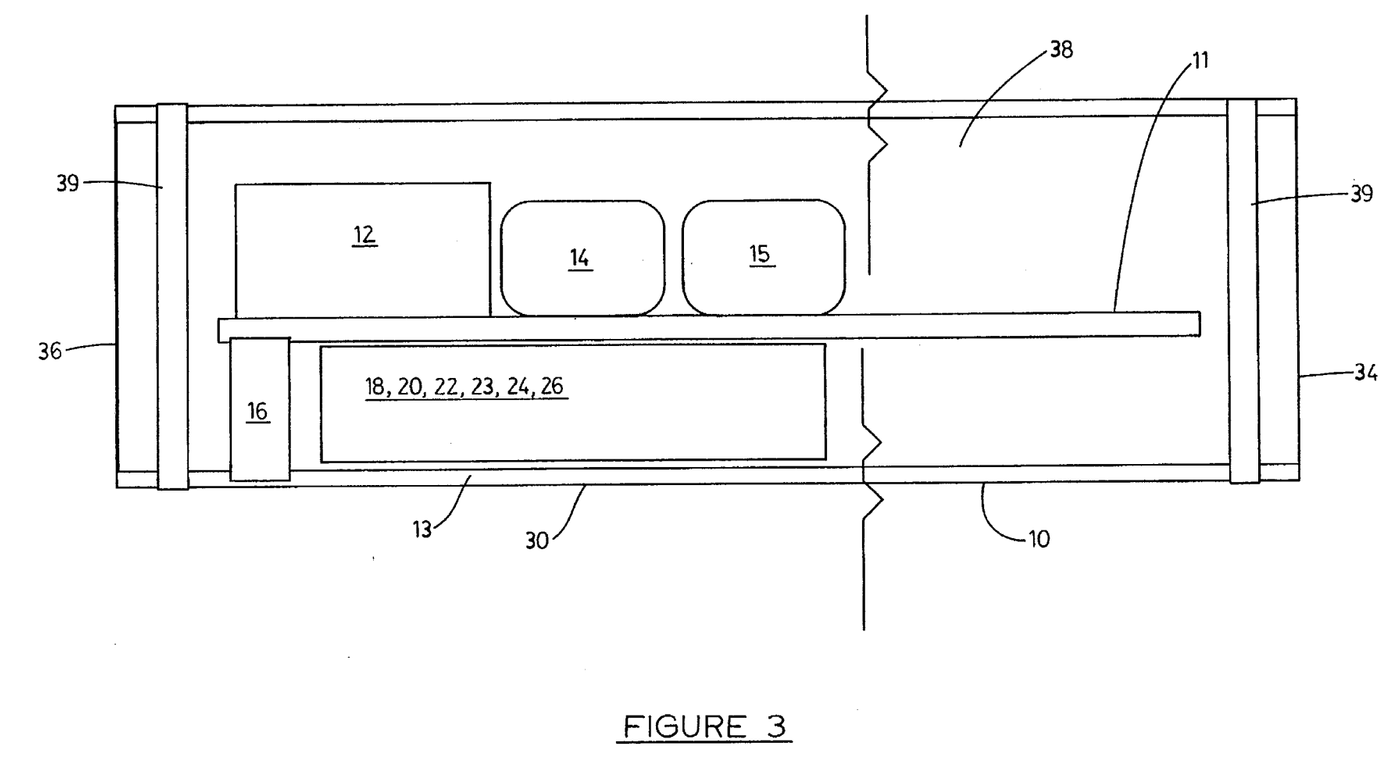
FIG. 3 is a cross-section taken along line 3—3 of FIG. 2.
Figure 4:
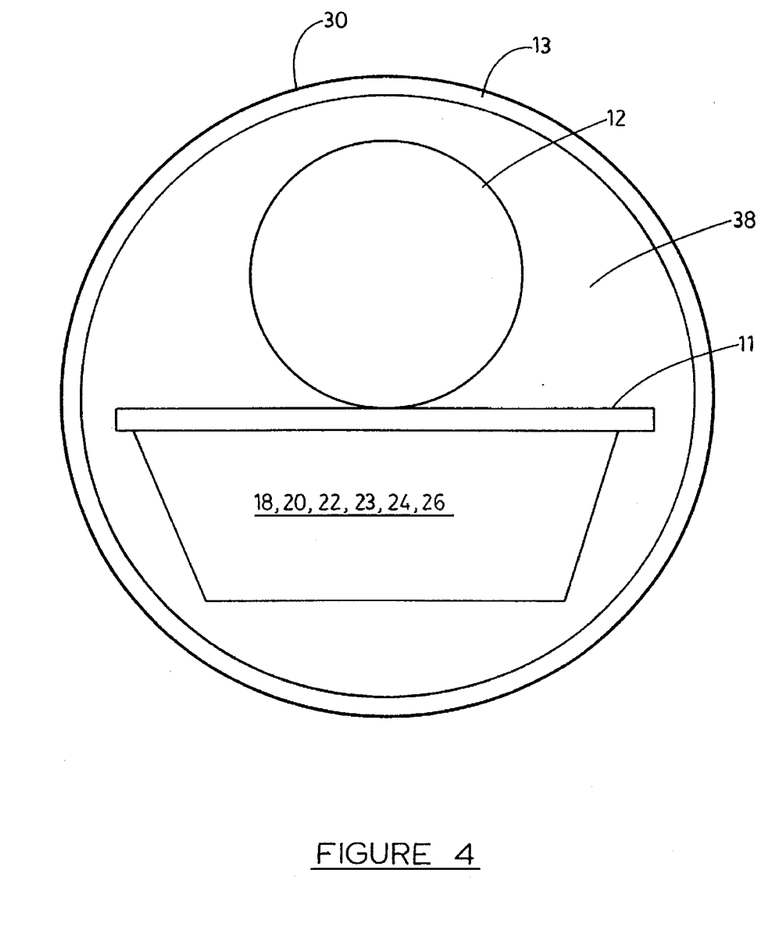
FIG. 4 is a cross-section taken along line 4—4 of FIG. 2.

The various electronic or circuit components of the device 10 are mounted to or connected with the circuit board 11, and these components are contained within the housing 13. FIGS. 2, 3, and 4 illustrate a possible arrangement of the electronic or circuit components in the circuit board 11 within the housing 13. The housing 13 is preferably formed as a cylindrical tube 30 having a circumferential wall 32 and two end walls 34 and 36. Suitable materials for the walls 32, 34, and 36 of the device 10 include cardboard or PVC tubing. The circuit board 11 and the various electronic and circuit components are mounted within the housing 13. The volume within the housing 13, in excess of the circuit board 11 and other various electronic and circuit components, is filled with a potting compound 38. The potting component 38 is preferably made of an epoxy resin which can be poured into the housing 13 in liquid form and which then cures to be hardened. The potting compound 38 gives the circuit mechanical, electric, and chemical stability, and further protects the circuit board 11 from corrosion or jarring of the components. If desired, holes 39 may be molded or drilled into the potting compound 38 for mounting purposes.

Figure 6:
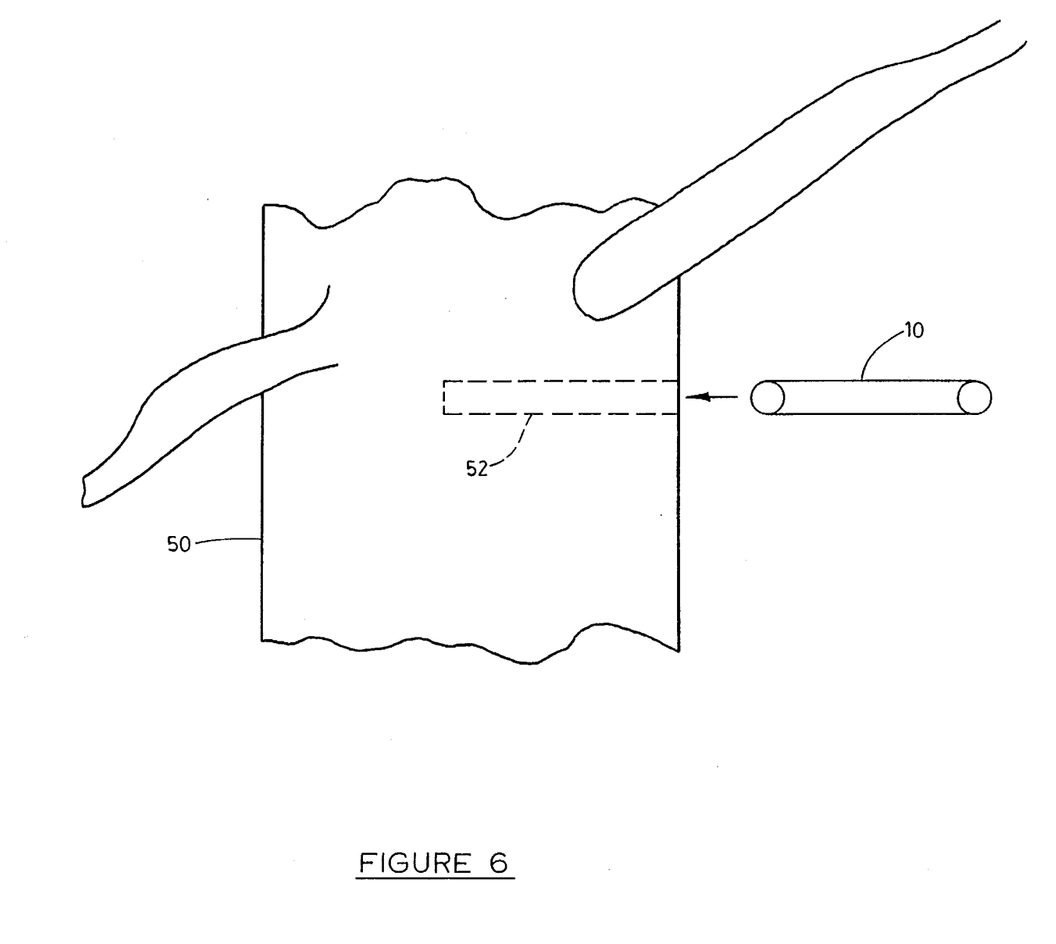
FIG. 6 is a view of a tree trunk showing the installation of the device of the present invention within a radial hole formed in the tree trunk, the hole being represented in phantom lines and an arrow being shown to represent the insertion of the device into the tree trunk, and the device being oriented horizontally and the hole being viewed from the side.
Figure 7:
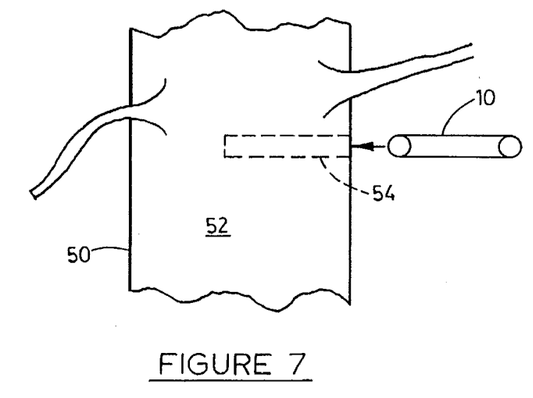
FIG. 7 is a side view of the tree trunk with the device inserted within the hole.
Figure 8:
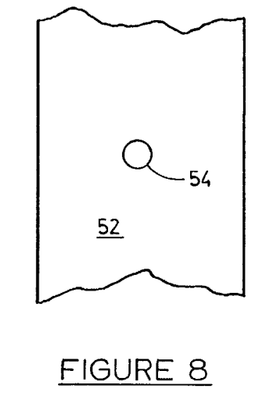
FIG. 8 is a front view of the tree trunk shown in FIG. 7 with the device inserted within the hole.

The installation of the device 10 as positioned or mounted within a tree 50 is shown in FIGS. 6 and 7. Preferably, a tree 50 into which the device 10 is to be inserted should be selected to have a trunk 52 large enough to contain the device 10, specifically the trunk 52 diameter being approximately one and one-half times of length of the tube 30. A cylindrical radial hole 54 is substantially drilled perpendicular to gravity or horizontal into the trunk 52 of the tree 50, and the diametral dimension of the hole 54 is made to be slightly larger than the diameter of the tube 30. To be effective, the hole 54 should be drilled at a height of approximately five to six feet, which is two to three feet above the height at which the tree 50 would be cut. If installed below this height, the device 10 would be ineffective as the tree 50 may be cut without triggering the switch 14. The trigger 16 is then activated, and the device 10 is inserted into the hole 54, so that the length of the tube 50 is substantially parallel to the gravitational force. It is to be understood that the device 10 must be constructed in this embodiment so that upon insertion into the trunk 52 of the tree 50, the switch 50 is oriented within the housing 13 so that the switch is "off" and the device 10 is not energized. Eventually, the tree 50 will heal over the hole 54 to completely conceal the device 10, and techniques known in the art may be used to speed the healing process. Alternately, or in the event the tree 50 does not heal over time, camouflage techniques may be employed to hide the device 10.

In the operation of the device 10, the device 10 remains dormant as long as both switches remain "off". The inclination switch 14 is oriented such that the switch is "off" when the length of the tube 30 is substantially horizontal (and since the hole 54 into which the device 10 is inserted is substantially perpendicular or radial to the trunk 52, the trunk 52 is upright or vertical when the switch 14 is "off") and the switch is "on" when the length of the tube 30 is substantially vertical (and in such case, the trunk 52 is felled or horizontal). When the tree 50 has been cut, burned down, or otherwise broken off below the height of the device 10 as installed within the tree 50, the change in inclination of the switch 14 induces energization of the electronic circuit and thereby broadcasts a signal which is received by a remote receiver. An alarm may then be set off at the location of the receiver to warn that the tree 50 has been felled.

Figure 9:
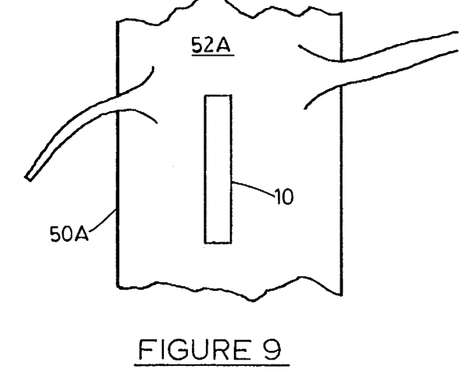
FIG. 9 is a view of tree trunk showing an alternate method of the installation of the device of the present invention with a vertical groove formed longitudinally in the tree trunk, the device being oriented vertically and the groove being viewed from the front.
Figure 10:
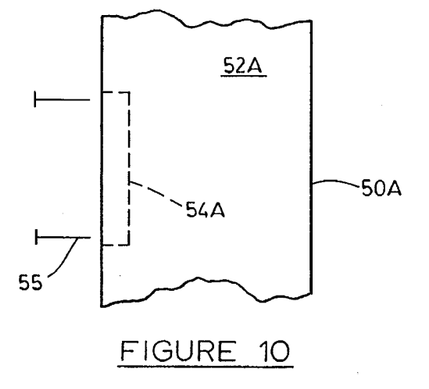
FIG. 10 is a view of the tree trunk with the device inserted within the groove employed in the second alternate method of the installation of the device of the present invention, the groove being viewed from the side in phantom lines.

Although discussion to this point has presumed that the device 10 remains "off" when the tube is inserted into a horizontal or radial hole 54 and the trunk 52 remains upright or vertical, and "on" when the trunk 52 has been felled or horizontal, FIGS. 9 and 10 depict a second embodiment in which a vertical groove 54A has been formed into the tree 50A. The switch 14 in the device of the second embodiment as depicted in FIGS. 9 and 10 is oriented such that the switch is "off" when the length of the tube 30 is substantially vertical, and the switch is "on" when the length of the tube 30 is substantially horizontal. The device 10 may be inserted into a substantially vertical groove 54A instead of a radial or horizontal hole 54 in situations where the diameter of the trunk 52 of the tree 50 is not large enough to accommodate the hole 54. The groove 54A should be of sufficient size for the device 10 to fit. If possible, the groove 54A should be deep enough to facilitate the camouflage process. Nails 55 may be used to assist in the installation of the device 10 within the tree 50A by inserting the nails 55 through the mounting holes 39.

The fire alarm switch 15 may also activate the device. This switch contains a metal or an alloy which has a specific shape at a specific temperature and another shape above a threshold temperature. The metal or alloy will be selected such that its threshold temperature is approximately the temperature of a containable forest fire. The desirable threshold temperature may vary because the normal temperature of the device's environment may vary. At external temperatures lower than the threshold temperature, the metal or alloy will have a shape which turns the device "off". When the environment's temperature exceeds the threshold temperature, the metal or alloy will change its shape such that it will provide a conduction path and turn the device "on".

Figure 11:
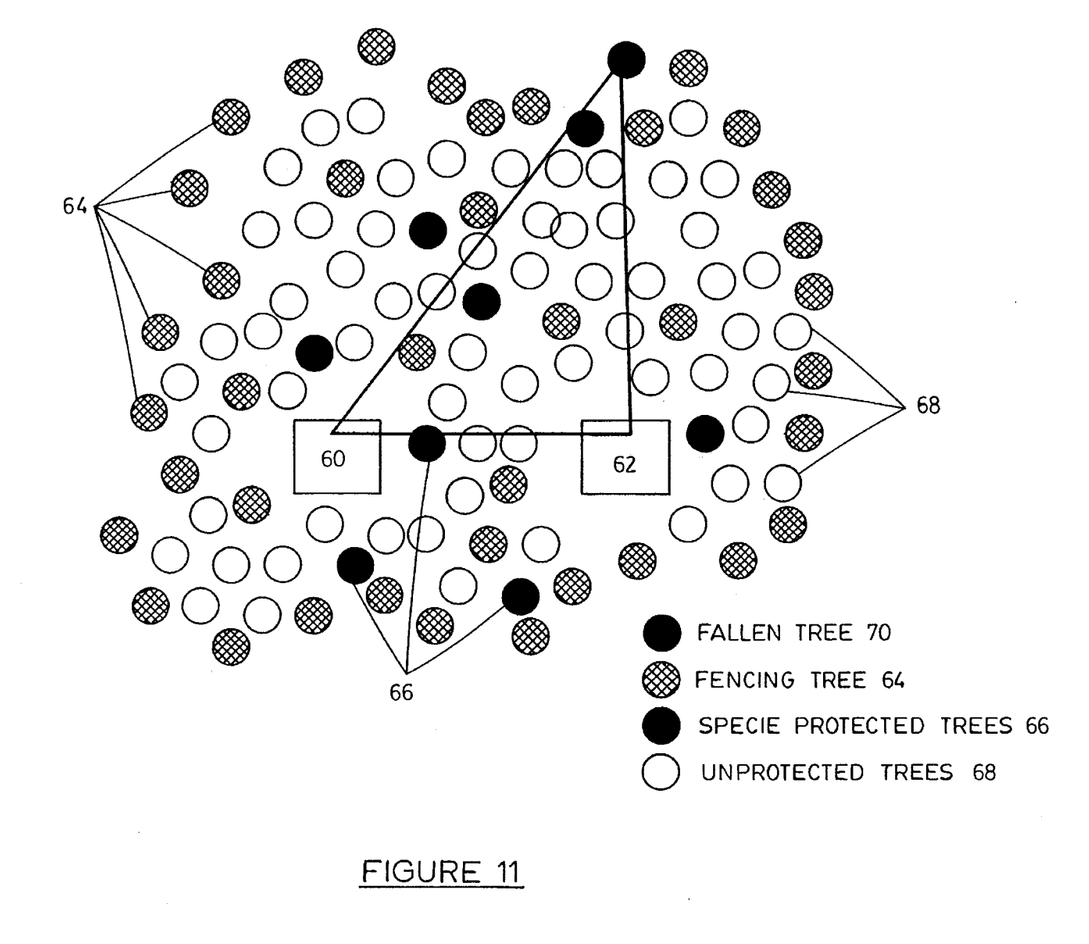
FIG. 11 is a block diagram showing an exemplary tree within which one of the devices has been installed, a first receiver, and a second receiver to illustrate the forest conservation system of the present invention.

The device 10 may be part of a greater forest conservation system such as depicted in FIG. 11 in which there is included a first receiver 60 and a second receiver 62, and wherein there may be a plurality of devices 10 each of which are installed into different trees. There may be a host of possible receiving stations such as fixed stations, roving stations, satellites and other means to detect the presence and direction of a signal. The devices 10 do not have to be installed into every tree of a forest area or portion of a forest which is sought to be protected. The trees into which one of the devices 10 are to be installed may be strategically selected in a pattern among trees. For example, the device 10 could be installed in those trees on the perimeter of the forest area or portion of the forest that is sought to be protected. By installing the devices 10 on selected trees on the perimeter of the forest area or the portion of the forest that is sought to be protected, an artificial "fence" is created. FIG. 11 demonstrates the creation of a "fence" by installation of the device 10 within trees 64. Thus, trees inside the "fence" could not be cut and transported without cutting trees on the perimeter. Additional layers of "fences" and random installation could further protect trees in the forest area or portion of the forest that is sought to be protected or reserved. For example, in FIG. 11, the devices 10 are further installed in specie protected trees shown as 66. The remainder of trees 68 are unprotected by the device 10, but protected by the "fence" created by the device 10 as installed within the trees 64.

Furthermore, random installation of the device in trees of the forest may serve as an early warning system against forest fires. Its effectiveness in the early detection of forest fires may be improved by strategic placement of the devices. The devices may be placed so that a forest fire may not consume more than a specific land area without triggering a fire alarm. Thus, the monitoring station may easily detect the presence of a potential forest fire.

In order to determine which device 10 is transmitting a signal to the receivers 60 and 62 from among a plurality of devices 10 installed within different trees, the receivers 60 and 62 employ triangulation techniques to pinpoint the location of the particular device 10 into which the fallen tree 50 has been installed. Triangulation techniques which are well-known in the art are employed to pinpoint the location of the felled tree. Triangulation is a technique for establishing the distance between any two points, or the relative position of two or more points, by using such points as vertices of triangle or series of triangles, such that each triangle has a side of known or measurable length that permits the size of the angles of the triangle and the length of either of its other two sides to be established by observations taken either upon or from the two ends of the base line. As depicted in FIG. 11, the base is the known distance between the receivers 60 and 62, and the first side of the triangle is established by the signal from the device 10 as installed in the tree 70 and received by the receiver 60, and the second side of the triangle is established by the signal from the device 10 as received by the receiver 62.

The system may be employed by companies, governments or other authorities to implement and enforce laws or regulations relating to logging bans, or may serve to protect the property rights of individuals on private land. Where specific types of trees are sought to be protected, the device could be installed on those specific trees that authorities seek to protect. Records of device installation and authorized cutting can also provide a good way of monitoring the population of certain tree species.

Figure 12:
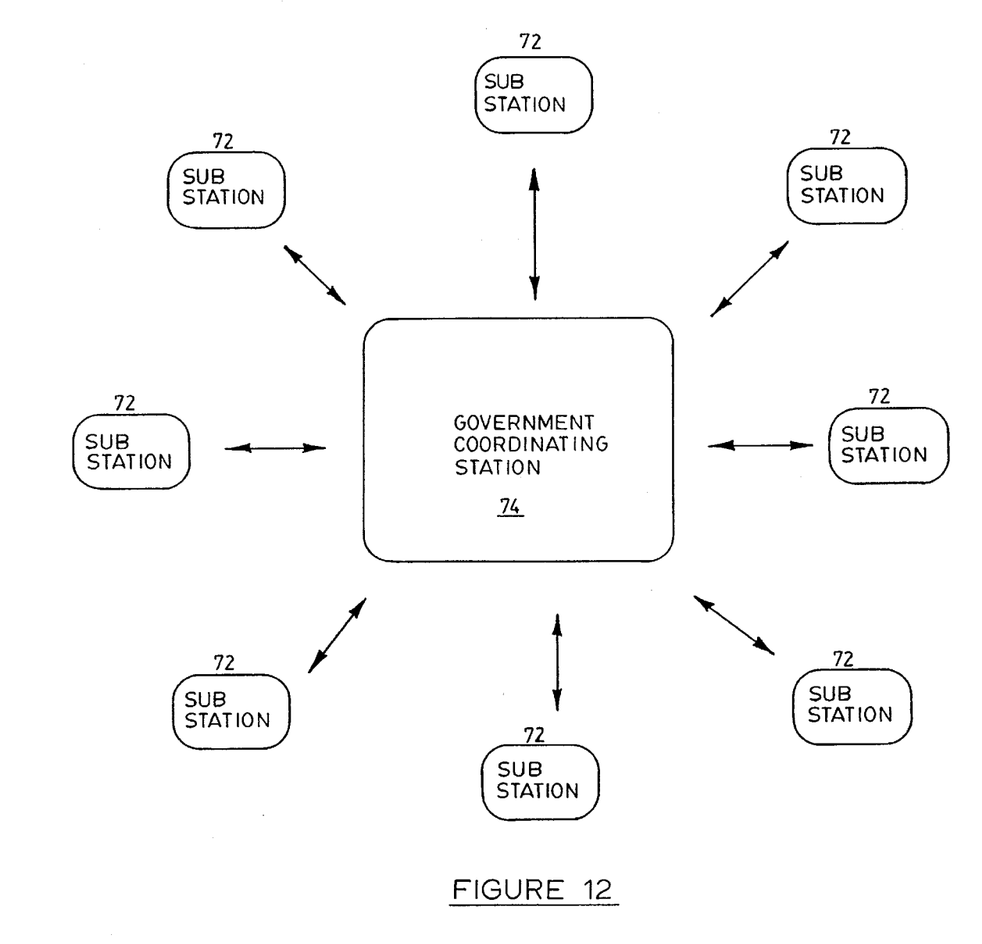
FIG. 12 is a flora diagram showing a forest conservation system which includes a government coordinating station and area monitoring substations.

The system also allows governments and corporations to centralize efforts to guard forests. As shown in FIG. 12, the system could be extended so that data gathered from substations 72, which are covering specific areas, could be sent to a central station 74 via electronic or communication links. In the central station 74 the data could be processed and used to improve government policies and policy administration.

The forest conservation system will also serve as a fire alarm system. Fallen trees due to forest fires could show a pattern which could be interpreted as a possible forest fire. The device 10 may be integrated with a fire alarm switch which will signal to the receivers 60 or 62 when a certain threshold temperature is exceeded. If a forest fire becomes uncontrolled, signals received by burning trees can provide information on the path of the fire.

It is to be understood that there may be any number of electronic or circuit configurations by which a suitable transmitter for use in accordance with the device 10 to signal the felling of a tree may be constructed, such constructions being within the ambit of one skilled in the art, and the present invention is intended to encompass such electronic or circuit variation. It is to be further understood that the device 10 and the system of the present invention as depicted in FIGS. 11 and 12 is not confined to the particular construction and arrangement of parts herein illustrated and described, but embraces such modified forms as come within the scope of the following claims.

What is claimed is:

1. A device capable of being used in a forest conservation system and for signaling the felling of a tree having a substantially stationary trunk which grows substantially upright, the device comprising:

(a) a switch which is responsive to detect inclination, the switch being positioned with respect to the trunk such that the switch is off when the trunk is in an upright position and the switch is on when the trunk has been felled;

(b) a transmitter electrically coupled to the switch and which is energized to transmit a radio signal to a remote location when the switch is on, and wherein the remote location has a device for receiving the same radio signal, and;

(c) a housing within which the switch and the transmitter are contained, wherein the housing is sized to fit within a hole formed in the trunk of the tree and the hole is formed so as to be readily filled or camouflaged thereby rendering the device and the forest conservation system substantially undetectable by unaided human vision.

2. The device of claim 1 wherein the switch is a mercury switch.

3. A system for forest conservation, the system including a plurality of devices for signaling the felling of each tree of particular trees within a predetermined area of forest, the predetermined area of forest having a perimeter and each tree having a substantially stationary main trunk which grows substantially upright, and wherein each of the devices comprises:

(a) a housing mounted on the main trunk and positioned at a height of at least about five feet;

(b) an inclination switch mounted within the housing, responsive to detect inclination, and positioned with respect to the trunk such that the inclination switch is off when the main trunk is in an upright position and the inclination switch is on when the main trunk is in a substantially horizontal position;

(c) a radio transmitter electrically coupled to the inclination switch and which is energized to transmit a radio signal to a remote location when the switch is on, the radio transmitter including: a one-time on switch for preventing the transmission of false alarms by the device before it is mounted within the main trunk;

and wherein the devices are positioned so that at least a portion of them are placed along the perimeter of the predetermined area of forest such that the felling of trees along the perimeter of the predetermined area of forest may serve as an indication of clear-cutting of a portion of the forest.

4. The system of claim 3, wherein each of the devices for signaling the felling of each tree of particular trees within the predetermined area of forest further comprises:

a fire alarm switch mounted within the housing, electrically coupled in parallel to the inclination switch, and capable of detecting ambient temperature, wherein the fire alarm switch is in an off position when the ambient temperature is less than a threshold temperature and is in an on position when the ambient temperature exceeds the threshold temperature.

5. The system of claim 3 wherein the devices are located on a perimeter of the portion of the forest.

6. The system of claim 3, further comprising a receiver located within in the predetermined area of forest and coupled in radio signal receiving relation to the radio transmitter of each of the devices.

7. The system of claim 3 further comprising a second receiver, and wherein triangulation is employed to determine the location of a tree being felled.

8. A method of forest conservation, the method comprising the steps of:

(a) mounting a plurality of tree felling signalling devices in a predetermined number of tree trunks in a predetermined area of forest, where each of the tree felling signalling devices includes a means for detecting inclination, a means for transmitting a signal, is mounted at a height of at least about five feet, and is individually placed in a hole in the tree trunks, the hole formed so as to be readily filled or camouflaged thereby rendering the device substantially undetectable by unaided human vision;

(b) transmitting a signal from one of the devices when the respective tree trunk has relocated from an upright position to a position where the trunk has been felled; and (c) receiving the signal at a remote location.

9. The method of claim 8 further comprising the steps of:

(d) receiving the signal at a second remote location; and (e) triangulating to determine the location of the particular tree which is being felled by comparing the signals received at the two remote locations.

10. The method of claim 8 further comprising the step of locating the devices on selected trees within the predetermined area of forest to indicate clear-cutting of the portion of the forest.

11. The method of claim 10 wherein the devices are located on a perimeter of the predetermined area of forest.

12. A system for forest conservation comprising a plurality of devices for signaling the burning of each particular tree of trees within the forest, and wherein each of the devices comprise:

(a) a switch which is mounted upon the particular tree and which is responsive to detect heat, the switch being off when the temperature is below a pre-selected threshold level and the switch being on when the temperature is above a pre-selected threshold level, the pre-selected threshold temperature being selected to be indicative of the burning of the tree; and (b) a radio transmitter electrically coupled to the switch and which is energized to transmit a radio signal to a remote location when the switch is on, and wherein the devices are located on selected trees the felling of which may serve as a indication of clear-cutting of a portion of the forest; and (c) a housing within which the switch and the transmitter are contained, wherein the housing is sized to fit within a hole formed in the trunk of the tree and the hole is formed so as to be readily filled or camouflaged thereby rendering the device and the forest conservation system substantially undetectable by unaided human vision.

13. The system of claim 12 and further comprising first and second receivers, and wherein triangulation is employed to determine the location of a tree being felled.

14. A device for signalling the burning or felling of a tree having a substantially stationary trunk which grows substantially upright, the device comprising:

(a) an inclination switch which is responsive to detect inclination, the inclination switch being positioned with respect to the trunk such that the inclination switch is off when the trunk is in an upright position and the inclination switch is on when the trunk has been felled;

(b) a fire alarm switch which is mounted upon the tree and which is responsive to detect heat, the fire alarm switch being off when the temperature is below a pre-selected threshold temperature and the fire alarm switch being on when the temperature is above a pre-selected threshold temperature, the pre-selected threshold temperature being selected to be indicative of the burning of the tree;

(c) a transmitter electrically coupled to the inclination switch and the fire alarm switch, the transmitter being energized to transmit a signal to a remote location when the inclination switch is on, the fire alarm switch is on, or both the inclination switch and the fire alarm switch are on; and (d) a housing within which the inclination switch, the fire alarm switch, and the transmitter are contained, wherein the housing is sized to fit within a hole formed in the trunk of the tree and the hole is formed so as to be readily filled or camouflaged thereby rendering the device substantially undetectable by unaided human vision.

15. A device for protecting a tree having a substantially stationary main trunk, the device comprising:

a housing capable of being operably mounted on the main trunk and sized so as to fit within a hole formed in the main trunk, the hole formed so as to be capable of being readily filled or camouflaged, thereby rendering the device substantially undetectable to unaided human vision;

an inclination switch mounted within the housing, responsive to detect the inclination of the main trunk, and positioned with respect to the main trunk such that the inclination switch is in an on position when the main trunk is in a substantially horizontal position;

a fire alarm switch mounted within the housing, electrically coupled in parallel to the inclination switch, and capable of detecting ambient temperature, wherein the fire alarm switch is in an off position when the ambient temperature is less than a threshold temperature and is in an on position when the ambient temperature exceeds the threshold temperature; and a radio transmitter electrically coupled to the inclination switch and the fire alarm switch, the radio transmitter including:

a one-time on switch for preventing the transmission of false alarms by the device before it is operably mounted within the main trunk, and which is energized to transmit a radio signal to a remote location when the inclination switch is in its on position, when the fire alarm switch is in its on position, or when both the inclination switch and the fire alarm switch are in their on position.

* * * * *